(12) United States Patent
Sims et al.

(10) Patent No.: US 8,442,588 B2
(45) Date of Patent: May 14, 2013

(54) SYSTEMS HAVING CABLES WITH WIRELESS COMMUNICATIONS CAPABILITIES

(75) Inventors: Nicholas A. Sims, San Francisco, CA (US); Jeffrey J. Terlizzi, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 455 days.

(21) Appl. No.: 12/877,970

(22) Filed: Sep. 8, 2010

(65) Prior Publication Data
US 2012/0058737 A1    Mar. 8, 2012

(51) Int. Cl.
    *H04B 1/38* (2006.01)
(52) U.S. Cl.
    USPC ....... 455/559; 455/557; 455/550.1; 455/41.2; 359/152
(58) Field of Classification Search ......... 455/559, 455/557, 550.1, 562.1, 41.2, 88, 262; 359/152, 359/159, 163
    See application file for complete search history.

(56) References Cited

U.S. PATENT DOCUMENTS

| | | | | |
|---|---|---|---|---|
| 4,092,629 A | * | 5/1978 | Siems et al. | 367/79 |
| 4,661,992 A | * | 4/1987 | Garay et al. | 455/90.3 |
| 5,077,789 A | * | 12/1991 | Clark et al. | 379/211.02 |
| 5,959,752 A | * | 9/1999 | Ota | 398/119 |
| 6,625,793 B2 | * | 9/2003 | Sample et al. | 326/38 |
| 7,309,012 B2 | * | 12/2007 | von Mueller et al. | 235/449 |
| 7,506,812 B2 | * | 3/2009 | von Mueller et al. | 235/449 |
| 7,568,621 B2 | * | 8/2009 | von Mueller et al. | 235/449 |
| 7,740,173 B2 | * | 6/2010 | Von Mueller et al. | 235/449 |
| 8,326,220 B2 | * | 12/2012 | Rhodes et al. | 455/40 |
| 2007/0072474 A1 | | 3/2007 | Beasley et al. | |
| 2007/0276765 A1 | * | 11/2007 | Hazel et al. | 705/71 |
| 2010/0055964 A1 | | 3/2010 | Hayashi et al. | |
| 2010/0081337 A1 | | 4/2010 | Dorogusker et al. | |
| 2012/0330843 A1 | * | 12/2012 | Von Mueller et al. | 705/64 |

\* cited by examiner

*Primary Examiner* — Minh D Dao
(74) *Attorney, Agent, or Firm* — Treyz Law Group; G. Victor Treyz

(57) ABSTRACT

In a system that includes electronic equipment such as a computer or power adapter and that includes electronic devices such as cellular telephones, media players, and other devices, cables may be provided with wireless transceiver circuitry. Each cable may include a power path without including data lines. When a user desires to power a device, the cable may be used to connect the device to the electronic equipment. The power path in the cable may deliver power from the electronic equipment to the electronic device. Data may be conveyed between the electronic equipment and the electronic device wirelessly, using the wireless transceiver circuitry in the cable. The cable may have first and second connectors at respective ends of the cable. The wireless transceiver circuitry may be contained within the first connector or within the first and second connectors. The wireless transceiver circuitry may be identified using an identifier.

25 Claims, 4 Drawing Sheets

SYSTEMS HAVING CABLES WITH WIRELESS COMMUNICATIONS CAPABILITIES

BACKGROUND

This relates to systems in which electronic devices are provided with power and data from external equipment.

Electronic devices such as portable media players and cellular telephones can be attached to external equipment such as power adapters and host computers. For example, a user who desires to charge a battery in an electronic device of this type may attach the device to a power adapter using a cable. When connected in this way, the power adapter may supply power to the device. The power may be used to operate the device and charge its battery. When the user wants to load music files or other data into the device, the electronic device may be connected to host computer using a cable. Power and data can be conveyed to the device from the host computer via the cable.

A typical cable for connecting an electronic device to external equipment has a Universal Serial Bus (USB) plug on one end and a 30-pin connector on its other end. The 30-pin connector may be plugged into a mating 30-pin connector in the electronic device. The USB plug may be plugged into a mating USB jack in a power adapter or host computer. Cables of this type have a pair of power wires for conveying power and a pair of data wires for conveying data. The inclusion of these wires in conventional cables can impose undesirable constraints on the size and flexibility of the cable.

It would therefore be desirable to be able to provide improved systems for conveying data and power between electronic devices and external equipment.

SUMMARY

A cable may be provided for connecting electronic devices to electronic equipment such as computers and power adapters. The cable may have power lines for conveying power, but need not include data lines. Wireless transceiver circuitry may be used to convey data.

In a typical system environment, electronic equipment such as a host computer may include one or more data ports. The data ports may include, for example, Universal Serial Bus connectors. It may be desirable to use the cable to connect a device such as a cellular telephone, a media player, a tablet computer, or other electronic device to the electronic equipment. The cable may have a first connector such as a Universal Serial Bus connector that plugs into one of the data ports on a computer and a second connector such as a 30-pin connector that plugs into a mating connector in the electronic device.

The wireless transceiver circuitry in the cable may be located in the first connector. The first connector may include data pins and power pins. The power pins may be coupled to power circuits in the electronic equipment. The power lines in the cable may convey power from the power pins in the first connector to power pins in the second connector. The second connector may be connected to the electronic device, so that power from the power path may be used to power the electronic device and charge a battery in the electronic device.

Data may be conveyed between control circuitry in the electronic equipment and the wireless transceiver circuit through the data pins in the first connector. The data that is received by the transceiver in this way may be wirelessly transmitted to a wireless transceiver in the electronic device. Information may also be wirelessly transmitted from the electronic device to the transceiver in the first connector.

To ensure that the wireless communications link that an electronic device forms is associated with a desired wireless transceiver, an identifier may be associated with the wireless transceiver of each cable. The wireless transceiver may convey the identifier to the electronic device using a power line modulation scheme in which an identifying code is conveyed to the electronic device by modulating voltages on the power lines in the cable. If desired, the identifier may be embedded in an identifier circuit such as an identifier circuit located in the second connector of the cable. The identifier may be used to distinguish a given transceiver from other nearby transceivers, thereby helping to ensure that the wireless transceiver in an electronic device establishes wireless communications only with the given transceiver and not the nearby transceivers.

To ensure that data can be conveyed wirelessly even if an electronic device does not have built-in wireless transceiver circuitry, a cable may be provided with a pair of transceivers at opposing ends of the cable. The transceivers may communicate wirelessly with each other while power is being routed over the power lines in the cable.

Further features of the present invention, its nature and various advantages will be more apparent from the accompanying drawings and the following detailed description.

DETAILED DESCRIPTION

This relates to systems in which electronic devices and external equipment are connected using cables. The cables need not include data lines. For example, the cables may contain a cable portion such as a flexible cylindrical plastic sheath that contains power path lines, but that is free of data lines. This cable arrangement may allow the cables to be compact and flexible. An illustrative system using this type of cable is shown in FIG. 1.

Figure 1:
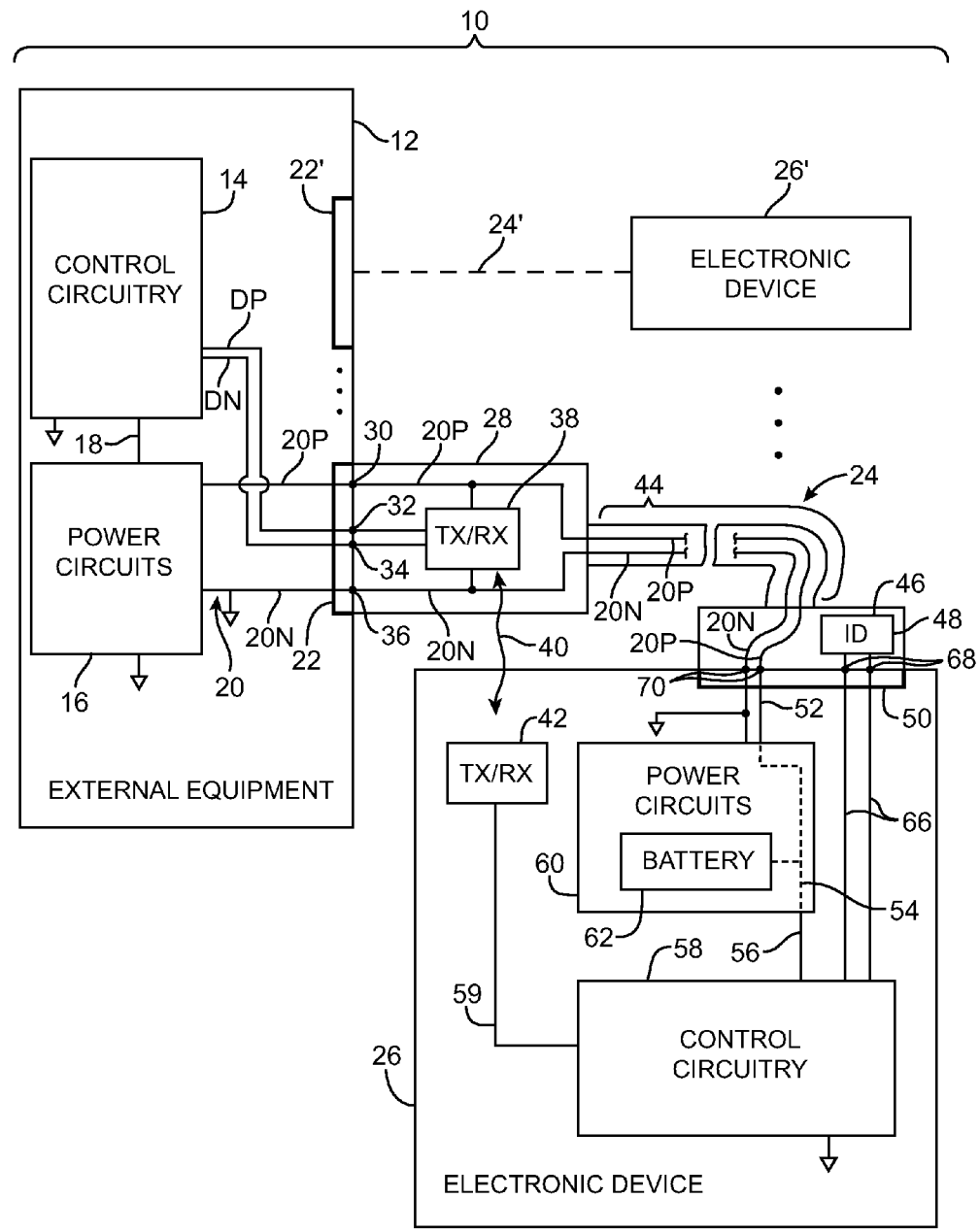
FIG. 1 is a schematic view of a system that includes an electronic device, external equipment, and a cable connected between the electronic device and external equipment in accordance with an embodiment of the present invention.

As shown in FIG. 1, system 10 may include external equipment 12 and electronic device 26. Cable 24 may be used to connect electronic device 26 to external equipment 12. As indicated by electronic device 26', cable 24', and port 22', system 10 may include multiple electronic devices each of which may be coupled to external equipment 12 by a respective cable.

In a typical arrangement, electronic device 26 may be a cellular telephone, tablet computer, or media player and external equipment 12 may be a host computer such as a laptop or desktop computer may be a power adapter. In general, however, external equipment 12 and electronic device 26 may be any suitable types of equipment such as desktop computers, computer monitors that contain computers or that are coupled to computers, laptop computers, tablet computers, cellular telephones, media players, other handheld and portable electronic devices, smaller devices such as wristwatch devices, pendant devices, headphone and earpiece devices, other wearable and miniature devices, power converters, networking equipment such as Universal Serial Bus (USB) hub equipment, accessories such as computer accessories, or other electronic equipment.

Equipment 12 may contain control circuitry 14 and power circuits 16. Device 26 may include control circuitry 58 and power circuits 60. Control circuitry 14 and 58 may include storage and processing circuitry based on one or more integrated circuits. Control circuitry 14 and 58 may, for example, include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 14 and 58 may be used to control the operation of equipment 12 and device 26. This processing circuitry may be based on one or more microprocessors, microcontrollers, digital signal processors, application specific integrated circuits, etc.

Power circuits 16 may receive power from an alternating current (AC) source such as an AC wall outlet or may receive power from a direct current (DC) source such as a battery. Power circuits 16 may include power regulator circuitry for regulating the power that is delivered to equipment 12 and device 26. Power circuits 16 may be coupled to control circuitry 14 by paths such as path 18. Power may be delivered to device 26 by power circuits 16 using positive power line 20P and ground power line 20N in power path 20.

Part of power path 20 may be located in equipment 12, part of power path 20 may be located in cable 24, and part of power path 20 may be located in device 26.

For example, conductive paths such as wires and printed circuit board traces may be used to route power from power circuits 16 to pins in connector 22 of equipment 12 such as positive power terminal (pin) 30 and ground power terminal (pin) 36. Connector 22 may be, for example, a USB jack. Cable 24 may include a connector such as plug 28 (e.g., a USB plug) that mates with connector 22. Cable 24 may also have a connector such as connector 46 (e.g., a plug such as a 30-pin plug) that mates with connector 50 (e.g., a 30-pin jack) in device 26. Connector 46 and connector 50 may be 30-pin connectors, USB connectors, or other suitable connectors. Connectors 28 and 46 may be coupled using cable segment 44. Segment 44 may be formed from a cable that contains conductive lines, optional shielding, dielectric materials to insulate the conductive lines from each other, and optional strengthening fibers. These components may be surrounded by a dielectric coating such as a cylindrical plastic sheath. The length of segment 44 may be, for example, 1-10 inches, 5-20 inches, 4-30 inches, 6 inches or more, etc. Power path 20 may include conductive paths 20P and 20N that lie within connector 28, conductive paths 20P and 20N that lie within cable segment 44, and conductive paths 20P and 20N that lie within connector 46 and device 26. Paths 20P and 20N may be implemented using wires (e.g., insulated wires), printed circuit board traces, or other conductive structures.

Electronic device 26 may include power circuits 60. When device 26 is coupled to equipment 12 by cable 24, power circuits 60 may receive DC power from equipment 12 over power lines 20P and 20N in power path 20. Power circuits 60 may include battery 62. When device 26 is connected to equipment 12, battery 62 may be charged by DC power from equipment 12 (e.g., a power adapter or a host computer that is supplying power through a USB port or other port). When device 26 is disconnected from equipment 12, battery 62 may be used by power circuits 60 to deliver power to the components of device 26 (e.g., control circuitry 58, etc.).

When connector 28 is connected to connector 22 in equipment 12, pins (contacts) in connector 22 form electrical connections with corresponding pins (contacts) in connector 28. In the example of FIG. 1, connector 22 has four pins. Two of the pins are connected, respectively, to the positive power line 20P and ground power line 20N of power path 20. These pins, which are sometimes referred to as power pins, mate with corresponding power pins in connector 28 (shown as terminals 30 and 36 in FIG. 1). In connector 28, paths 20P and 20N distribute power from the power pins to wireless transceiver circuitry 38. The other two pins in connector 22 are sometimes referred to as data pins and mate with corresponding data pins in connector 28 (shown as terminals 32 and 34 in FIG. 1).

In equipment 12, the data pins of connector 22 may be coupled to control circuitry 14 by a data path such as a USB differential data path formed from data lines DP and DN. In connector 28, the DP and DN lines may be connected to circuitry 38. Circuitry 38 may include a USB transceiver for communicating with a corresponding USB transceiver in control circuitry 14 over data lines DP and DN. Circuitry 38 may also include wireless transceiver circuitry such as radio-frequency transmitter and receiver circuitry (e.g., Bluetooth® circuitry operating at 2.4 GHz or other suitable wireless communications circuitry).

During data transmission operations, control circuitry 14 can send data to transceiver 38 via the wired path formed form lines DP and DN. Transceiver circuitry 38 (e.g., the radio-frequency transmitter in circuitry 38) may wirelessly transmit radio-frequency signals that correspond to the received data to wireless transceiver circuitry 42 in device 26 over wireless communications path 40.

During data reception operations, radio-frequency transceiver circuitry 38 (e.g., the radio-frequency receiver in circuitry 38) may receive data via path 40 that has been transmitted from device 26 using wireless transceiver circuitry 42.

Circuitry 42 may contain a Bluetooth® transmitter and receiver that supports bidirectional communications with a corresponding Bluetooth® transmitter and receiver in transceiver circuitry 38 or other suitable wireless communications circuitry may be used in supporting wireless communications over wireless link 40. Control circuitry 58 may be coupled to circuitry 42 by path 59. Circuitry 58 may transmit information to circuitry 38 over path 40 using circuitry 42 and may receive information from circuitry 38 over path 40 using circuitry 42.

Because wireless link 40 makes it possible to transmit and receive data between equipment 12 and device 26 without using data lines in cable 24 (i.e., without data lines in cable portion 44 of cable 24), it is not necessary to include data lines in cable 24. As shown in FIG. 1, transceiver circuitry 38 may receive data from data pins 32 and 34 over corresponding data paths in connector 28, but cable 44 need contain only power lines 20P and 20N. Data lines DN and DP can be omitted from cable 44 and connector 46. Because data lines DN and DP do not extend along the length of cable 24, cable 24 (i.e., cable portion 44 of cable 24) may be smaller and more flexible than would be possible if data lines DN and DP were included in cable portion 44). Paths 20N and 20P may be implemented using solid or stranded wire (e.g., copper wire) and may, if desired, be covered with a sheath (e.g., a cylindrical sheath formed from a dielectric such as plastic). Shielding layers and strands of strengthening fiber may be included in cable 44 if desired.

As shown in FIG. 1, cable 24 may have a connector such as connector 46 that mates with a corresponding connector such as connector 50 in device 26. Connectors 46 and 50 may be, for example, 30-pin connectors. Positive power path 20P and ground power path 20N may be coupled to corresponding positive and ground power pins in connector 46. The power pins of connectors 46 and 50 are shown as terminals 70 in FIG. 1.

In device 26, paths such as path 52 may be used to distribute power to power circuits 60. Power circuits 60 may use paths such as path 54 to distribute power from path 52 and/or battery 62 to path 56 and control circuitry 58.

Using an arrangement of the type shown in FIG. 1, equipment 12 may provide power to device 26 using the wired power paths of cable 24. Cable 24 need not include data paths and may therefore be formed using a compact and, if desired, flexible cable configuration. When equipment 12 is a power adapter, it may be desirable to use equipment 12 to convey information to device 26 such as information on the power capacity of the power adapter. Device 26 may use information on the power capacity of the power adapter to ensure that power circuits 60 do not draw too much power from equipment 12. When equipment 12 is a host computer, it may be desirable to use equipment 12 to convey information to device 26 such as content (e.g., media data such as text files, image files, audio files and video files, text data, etc.), control data, information on the power capacity of equipment 12, information on other capabilities of equipment 12, and other information. During communications with equipment 12, it may be desirable to convey information from device 26 to equipment 12 such as control data, handshaking data, information on the operating status of device 26, information on the capabilities of device 26, media data, user input, and other information. In the absence of data wires in cable portion 44 of cable 24, wireless link 40 may be used to convey these various types of data between equipment 12 and device 26.

In system environments in which multiple devices are present, it may be desirable to support a discovery mechanism that ensures that equipment 12 communicates with the correct device. In a typical operating scenario, a user of device 26 may desire to power device 26 using cable 24 and may desire to exchange data with equipment 12 (e.g., to wirelessly sync data between a host computer and device 26). The user may plug connector 46 into connector 50 of device 26 and may plug connector 28 into connector 22 of equipment 12. Equipment 12 may then deliver power to device 26 over power path 20 in cable 24. Wireless transceiver 38 may form a wireless link with wireless transceiver 42 so that data may be transferred from equipment 12 to device 26 and from device 26 to equipment 12.

To ensure that link 40 is formed with the transceiver circuitry of device 26, rather than the transceiver circuitry of device 26', cable 24 may provide equipment 26 with identifying information. For example, transceiver 38 may modulate the positive power supply voltage on positive power line 20P (e.g., by blocking and unblocking the positive power supply voltage to create data bits). The modulation pattern that is impressed upon the voltage on path 20 may be conveyed to device 26 over power path 20. Control circuitry 58 may receive the modulated power signal via path 52, path 54, and path 56 (as an example).

Control circuitry 58 may recognize the modulation pattern that is conveyed over power path 20 and may extract an address or other identifier from the modulation pattern. This identifier may be used to uniquely identify the transceiver (e.g., transceiver 38 in cable 24) that is being used in communicating data. Because device 26 is informed of the identity of the transceiver that is involved in communications link 40, device 26 can avoid inadvertently forming link 40 with the wrong transceiver (i.e., device 26 can avoid communicating with the transceiver in cable 24' rather than the transceiver in the cable attached to device 26). The identifier that is transmitted to device 26 may be a Bluetooth® identifier and transceiver 42 can be used to form a link with transceiver 38 based on this Bluetooth® identifier (as an example).

If desired, the identifier may be conveyed to device 26 from an identifier circuit in cable 24 such as identifier circuit 48. Circuit 48 may be, for example, a resistor with a resistance value that uniquely identifies a wireless address associated with transceiver circuitry 38, a voltage divider circuit that uniquely identifies circuitry 38, or other suitable identifying circuitry. As shown in FIG. 1, control circuitry 58 may obtain the identifier from identification circuitry 48 via data pins 68 (e.g., contacts in a 30-pin connector such as connectors 46 and 50) and paths 66.

In situations in which device 26 does not receive an identifier (e.g., when device 26 does not receive a modulated power supply signal identifying circuit 38 and does not receive an encoded resistance value or other circuit parameter from identifier circuit 48 because circuit 48 is not present or because equipment 12 is a power adapter without wireless communications capabilities), device 26 can receive power from equipment 12, can communicate with equipment 12 using data wires in the cable (if present), and can refrain from attempting to form a wireless communications link with equipment 12.

Figure 2:
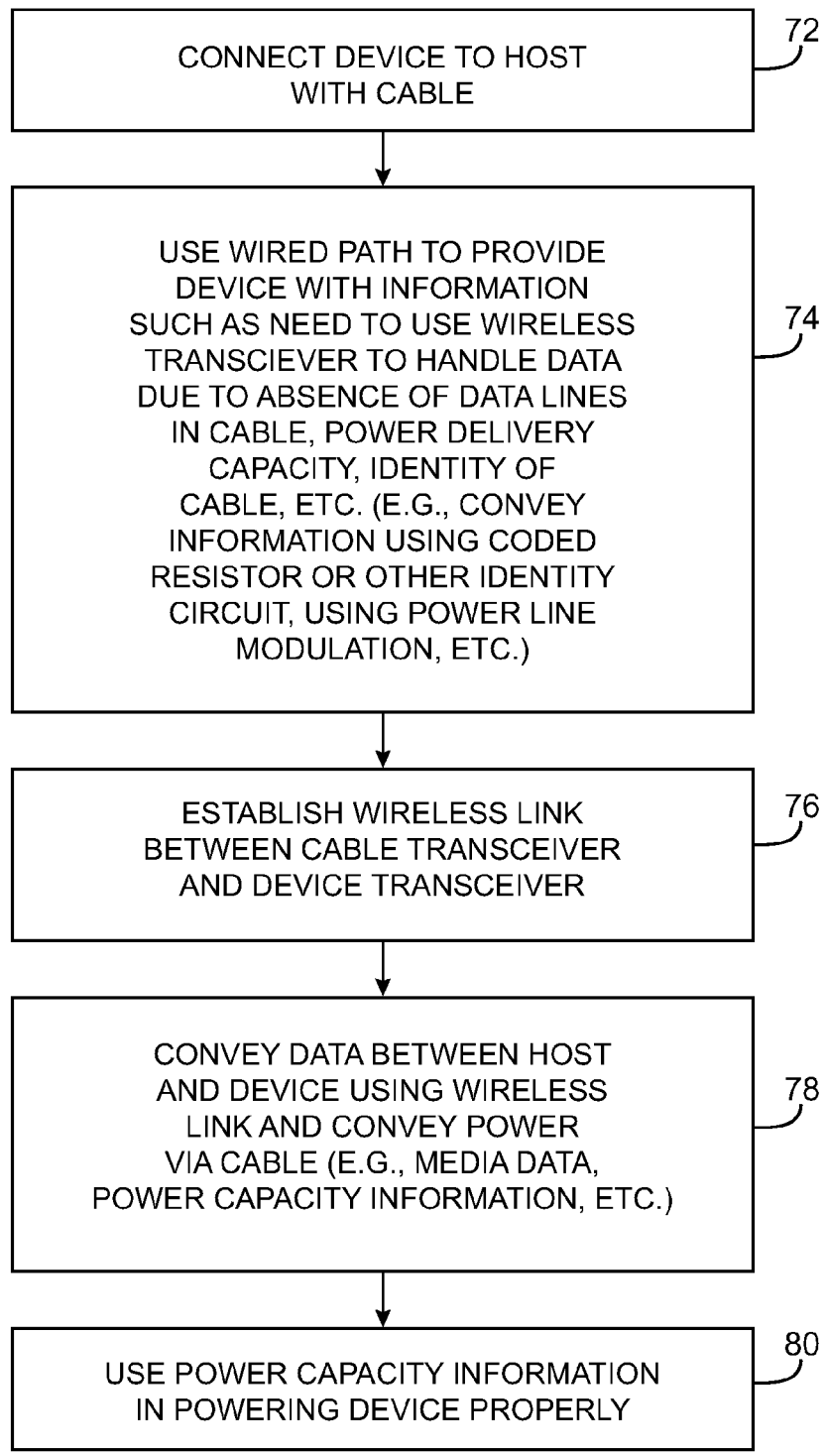
FIG. 2 is a flow chart of illustrative steps involved in operating a system of the type shown in FIG. 1 in accordance with an embodiment of the present invention.

Illustrative steps involved in using a system such as system 10 are shown in FIG. 2.

At step 72, a user may connect device 26 to equipment 12 using cable 24. Equipment 12 may be a power adapter or a host (e.g., a computer with USB data ports such as the port formed with connector 22 of FIG. 1).

At step 74, information on the identity of transceiver 38 may be conveyed to device 26. For example, transceiver 38 may modulate the voltage on power path 20 (e.g., the positive voltage on path 20P) to inform device 26 of the identity of transceiver 38. If desired, cable 24 may be provided with an identifier circuit such as circuit 48 that informs device 26 of the identity of transceiver 38. The identity of transceiver 38 may be represented using a code such as an address (e.g., wireless address information), a serial number, a batch number, or any other type of identifying information that helps uniquely (or at least somewhat uniquely) identify transceiver 38. Each transceiver 38 that is manufactured need not be provided with a unique identifier, provided that a sufficient number of identifiers are used. With a sufficient number of identifiers (e.g., hundreds or thousands), the likelihood that a particular user and system 10 will include two identically identified transceivers will be minimal.

During the operations of step 74, additional information such as information on the power capacity of equipment 12 may also be conveyed to device 26. This information may be transmitted using power line modulation and/or identifier circuitry and may include information on the maximum power handling capabilities of equipment 12 and/or cable 24. Power line signals may be produced by modulating the voltage on path 20 using transceiver 38. If desired, control circuitry 14 can convey information to transceiver 38 and transceiver 38 can forward this information using power line modulation. Control circuitry 14 may also direct power circuits 16 to modulate the voltages on path 20 to convey information to device 26.

After obtaining information that identifies transceiver 38, electronic device 26 may use transceiver circuitry 42 in establishing wireless link 40 with transceiver 38 (step 76). The identifying information distinguishes transceiver 38 from other transceivers in system 10 and thereby ensures that link 40 will be formed between the proper pair of transceivers (i.e., between transceiver 38 and transceiver 42 in the example of FIG. 1).

Establishing wireless link 40 between transceiver 38 and transceiver 42 allows data to be transferred between connector 28 and device 26 without the need to use data wires in cable segment 44 of cable 24. Because cable 24 does not need to include data wires, its thickness can be minimized. During the operations of step 78, data can be conveyed between control circuitry 14 of equipment 12 and control circuitry 58 of electronic device 26. Data may be conveyed between control circuitry 14 and transceiver 38 using a wired data path formed form data lines DP and DN (FIG. 1). Data may be conveyed wirelessly over link 40 between transceiver 38 in connector 28 and transceiver 42 in device 26. The data that is conveyed may be media data, control data, or other information. Power can be conveyed using power path 20. This allows device 26 to be powered and allows battery 62 in device 26 to be charged via cable 24 at the same time that data is being wirelessly conveyed over wireless link 40. Information on the power capacity of equipment 12 and/or cable 24 may be used when powering device 26 (see, e.g., step 80). For example, device 26 can configure power circuits 60 so that power circuits 60 draw no more than a maximum allowable amount of power from cable 24 and equipment 12.

Operations of the type set forth in FIG. 2 may be used in system environments that contain multiple cables and multiple electronic devices, because of the identifier (ID) that is provided for each transceiver 38 (by power line modulation by transceiver 38 based on an ID value stored in the transceiver 38 or by an identity value stored in identifier circuit 48). In environments in which a device is connected to equipment 12 using a legacy cable (i.e., a cable whose connectors does not include a wireless transceiver), data may be conveyed between equipment 12 and that device using data paths in the legacy cable, while devices that are connected to equipment 12 with cables 24 can transmit and receive data wirelessly using the wireless capabilities of cables 24.

If desired, a cable in system 10 may be provided with a pair of matched wireless transceivers. One transceiver may be associated with one end of the cable and the other transceiver may be associated with the other end of the cable. For example, a first wireless transceiver may be mounted in a first plug at a first end of the cable and a second wireless transceiver may be mounted in a second plug at a second (opposing) end of the cable. The cable may contain power wires (e.g., positive and ground wires), but need not contain any data wires. When it is desired to transmit data (e.g., media files, control information, etc.), the wireless transceivers at either end of the cable can communicate with each other. This type of arrangement makes it possible for devices without wireless capabilities to communicate with the host.

Figure 3:
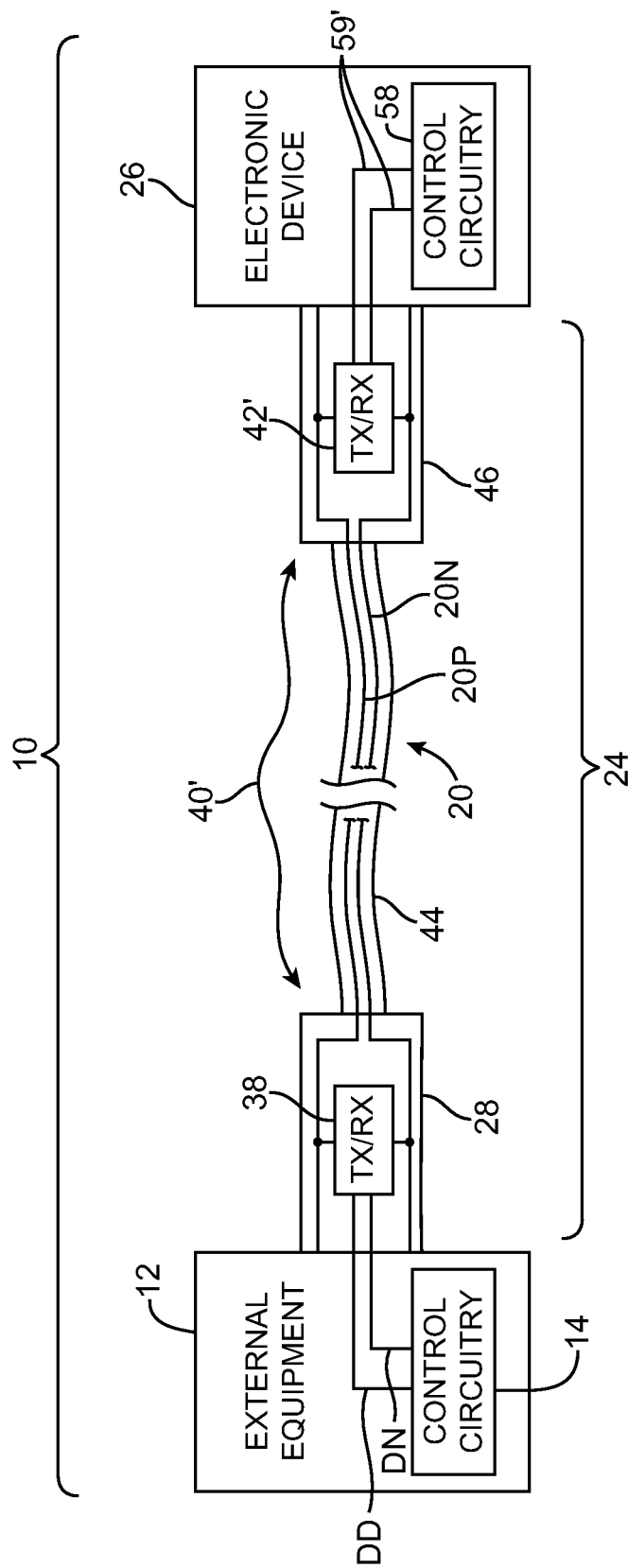
FIG. 3 is a schematic diagram of a system that includes an electronic device, external equipment, and a cable with two wireless transceivers that is connected between the electronic device and external equipment in accordance with an embodiment of the present invention.

An example of this type of arrangement is shown in FIG. 3. As shown in FIG. 3, external equipment (host) 12 may contain control circuitry 14 that communicates over a wired data path (e.g., wires DD and DN) with wireless transceiver 38 in plug (connector) 28. At the other end of cable 24, electronic device 26 may be connected to plug (connector) 46 of cable 24. Control circuitry 58 in device 26 may communicate with wireless transceiver 42' in plug 46 using wired path 59'. Cable segment 44 may contain power lines 20P and 20N in power path 20 for routing power from external equipment 12 to electronic device 26, but need not contain any data lines.

Transceivers 38 and 42' may each be preprogrammed to recognize each other during wireless transmissions (i.e., transceivers 38 and 42' may be set up as a matched pair by providing transceiver 38 with address information for transceiver 42' and by providing transceiver 42' with address information for transceiver 38). Using the address information, wireless transmissions from transceiver 38 may be transmitted to transceiver 42' and received by transceiver 42', whereas wireless transmissions from transceiver 42' may be transmitted to transceiver 38 and received by transceiver 38. Wireless link 40' between transceivers 38 and 42' may be used to convey data such as media files, status information, control commands, information on the capability of equipment 12 to deliver power, information identifying equipment 12 and equipment 26, etc. At the same time, power can be conveyed over paths 20P and 20N.

Figure 4:
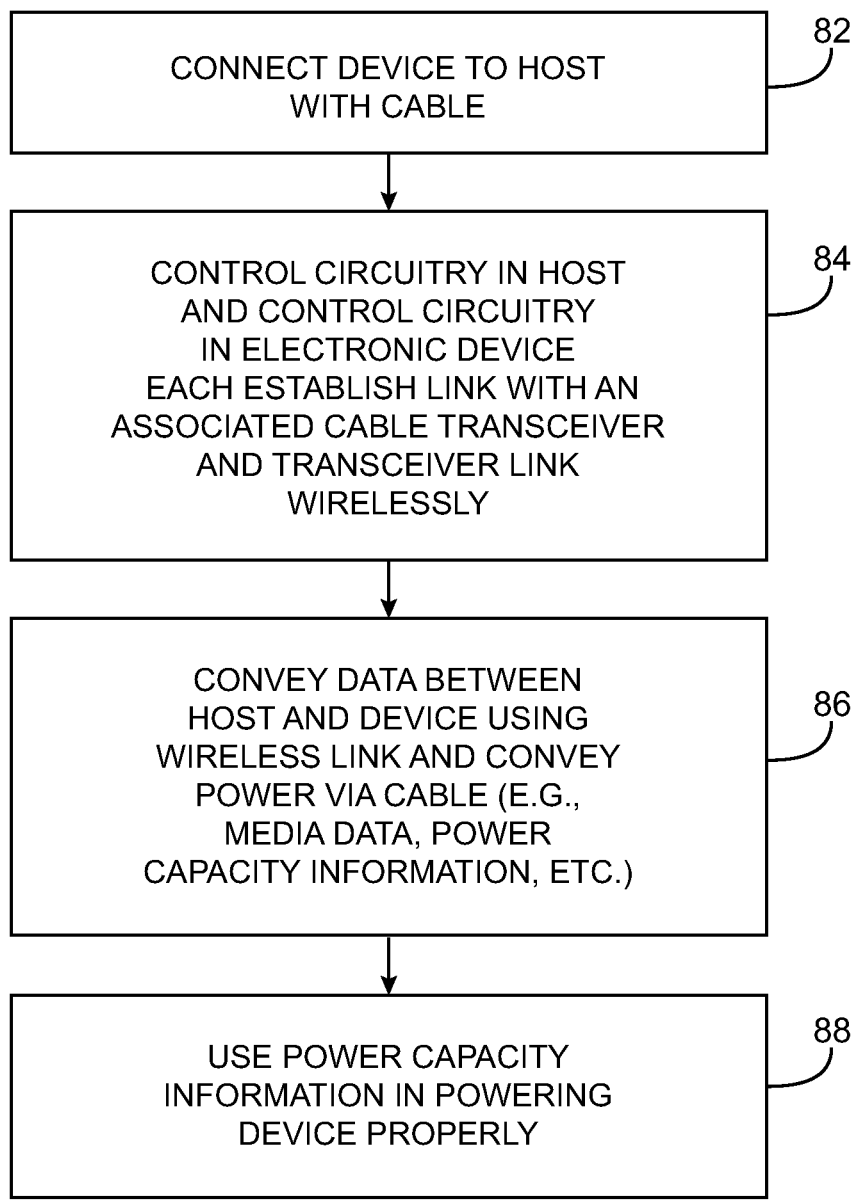
FIG. 4 is a flow chart if illustrative steps involved in operating a system of the type shown in FIG. 3 in accordance with an embodiment of the present invention.

Illustrative steps involved in operating the equipment of system 10 of FIG. 3 are shown in FIG. 4.

At step 82, a user may connect device 26 to equipment 12 using cable 24 of FIG. 3. Cable 24 may contain a pair of mated wireless transceivers, so that cable segment 44 need not include data wires. Equipment 12 may be a power adapter or a host (e.g., a computer with USB data ports such as the port formed with connector 22 of FIG. 1).

At step 84, control circuitry 14 of equipment 12 may form a connection with transceiver 38 over data path lines DD and DN and equipment 58 may form a connection with transceiver circuitry 42' over data path 59'. Paths such as the path formed using lines DD and DN and the path formed by lines 59' may, for example, use a serial communications link protocol such as a Universal Serial Bus protocol (as an example). Wireless transceivers 38 and 42' may be preprogrammed (e.g., during manufacturing) with address information that allows transceivers 38 and 42' to establish wireless link 40' when powered by power path lines 20P and 20N. By using sufficiently unique addressing information for transceivers 38 and 42' during manufacturing, the potential for forming link 40' between any pair of transceivers other than transceivers 38 and 42' may be minimized or eliminated.

At step 86, following establishment of wireless link 40', data can be transferred wirelessly between connector 28 and connector 46 of cable 24 in FIG. 3 without the need to use data wires in cable segment 44 of cable 24. Because cable 24 does not need to include data wires, its thickness can be minimized. The data that is conveyed may be media data, control data, information on the power capacity of equipment 12 or cable 24, or other information.

Power can be conveyed using power path 20. This allows device 26 to be powered and allows the battery in device 26 to be charged via cable 24 at the same time that data is being wirelessly conveyed over wireless link 40'. Information on the power capacity of equipment 12 and/or cable 24 may be used when powering device 26 (see, e.g., step 88). For example, device 26 can configure its power circuits (see, e.g., power circuits 60 of FIG. 1) so that the power circuits draw no more than a maximum allowable amount of power from cable 24 and equipment 12.

Operations of the type set forth in FIG. 4 may be used in system environments that contain multiple cables and multiple electronic devices, because each pair of cable transceivers (i.e., transceiver 38 in connector 28 and transceiver 42' in connector 46 at the opposite end of cable 24 and segment 44) may be matched by assigning known addresses to the transceivers during manufacturing.

The foregoing is merely illustrative of the principles of this invention and various modifications can be made by those skilled in the art without departing from the scope and spirit of the invention.

What is claimed is:

1. A cable having first and second ends, comprising:
   a first connector at the first end that includes power pins and data pins;
   a second connector at the second end that includes at least power pins;
   a cable segment that has a power path that connects the power pins of the first connector to the power pins of the second connector; and
   a wireless transceiver.

2. The cable defined in claim 1 wherein the wireless transceiver is located in the first connector and is electrically connected to the data pins.

3. The cable defined in claim 1 further comprising an identifier circuit in the second connector.

4. The cable defined in claim 3 wherein the identifier circuit comprises a resistor connected to a data pin in the second connector.

5. The cable defined in claim 1 wherein the wireless transceiver is configured to modulate voltages on the power path.

6. The cable defined in claim 5 wherein the wireless transceiver is configured to modulate voltages on the power path to produce a modulation pattern that identifies the wireless transceiver.

7. The cable defined in claim 1 wherein the first connector comprises a Universal Serial Bus connector and wherein the second connector comprises a 30-pin connector.

8. The cable defined in claim 1 wherein the wireless transceiver comprises a Bluetooth® transceiver.

9. The cable defined in claim 1 wherein the wireless transceiver conveys data while power is conveyed over the power path and wherein the cable segment is free of data wires.

10. The cable defined in claim 1 further comprising an additional wireless transceiver that wirelessly communicates with the wireless transceiver.

11. The cable defined in claim 10 wherein the wireless transceiver is mounted in the first connector and wherein the additional wireless transceiver is mounted in the second connector.

12. A method for conveying data between electronic equipment and an associated electronic device using a cable that includes first and second connectors, comprising:
   attaching one end of the cable to the electronic equipment using the first connector;
   attaching another end of the cable to the electronic device using the second connector; and
   with transceiver circuitry in the cable, wirelessly transmitting the data.

13. The method defined in claim 12 wherein the first connector comprises a pair of data pins and a pair of power pins, the method further comprising:
   at the transceiver circuitry, receiving the data from the electronic equipment through the pair of data pins and receiving power through the pair of power pins.

14. The method defined in claim 13 wherein the cable includes a power path that is coupled between the first connector and the second connector and wherein the transceiver circuitry is contained within the first connector, the method further comprising:
   at the transceiver circuitry in the first connector, modulating voltages on the power path.

15. The method defined in claim 13 wherein the cable includes a power path that is coupled between the first connector and the second connector and wherein the transceiver circuitry is contained within the first connector, the method further comprising:
   conveying power over the power path from the electronic equipment to the electronic device.

16. The method defined in claim 15 wherein the data comprises media data and wherein wirelessly transmitting the data comprises wirelessly transmitting the media data to a wireless receiver in the electronic device while the power is being conveyed to the electronic device over the power path.

17. The method defined in claim 16 wherein the wireless transceiver circuitry comprises a first wireless transceiver in the first connector and a second wireless transceiver in the second connector and wherein wirelessly transmitting the data comprises wirelessly transmitting the data from the first transceiver to the second transceiver.

18. A cable, comprising:
   a first connector having data pins and power pins;
   a wireless transceiver connected to the data pins and the power pins;
   a length of cable that is free of data lines and that contains power lines that are connected to the power pins in the first connector at a first end of the length of cable; and
   a second connector that is connected to the power lines at a second end of the length of cable.

19. The cable defined in claim 18 wherein the wireless transceiver is located in the first connector.

20. The cable defined in claim 19 wherein the second connector comprises an identifier circuit that supplies an identifier that identifies the wireless transceiver.

21. The cable defined in claim 20 wherein the wireless transceiver has an input that receives data from a computer via the data pins and wherein the wireless transmitter is configured to wirelessly transmit the data received from the computer to an electronic device.

22. The cable defined in claim 21 wherein the first connector comprises a Universal Serial Bus connector.

23. The cable defined in claim 21 wherein the second connector comprises a 30-pin connector.

24. The cable defined in claim 18 further comprising an additional wireless transceiver that wirelessly communicates with the wireless transceiver.

25. The cable defined in claim 24 wherein the wireless transceiver is mounted in the first connector and wherein the additional wireless transceiver is mounted in the second connector.

* * * * *